3,526,698
Patented Sept. 1, 1970

3,526,698
STABILIZATION OF LEVO-3-(3,4-DIHYDROXY-PHENYL)-2-METHYLALANINE WITH SODIUM BISULFITE AND SORBITOL
Gerald P. Polli, Norristown, Pa., Wayne M. Grim, Hertford Heath, England, and Thomas J. Macek, Jenkintown, Pa., assignors to Merck and Co., Inc., Rahway, N.J., a corporation of New Jersey
No Drawing. Continuation-in-part of application Ser. No. 493,556, Oct. 6, 1965. This application Apr. 11, 1968, Ser. No. 720,478
Int. Cl. A61k 27/00
U.S. Cl. 424—175                                              1 Claim

ABSTRACT OF THE DISCLOSURE

The therapeutic agent levo-3-(3,4-dihydroxyphenol)-2-methylalanine is made stable in oral, fluid pharmaceutical formulation by the addition of sodium bisulfite and sorbitol.

---

This application is a continuation-in-part of U.S. Ser. No. 493,556, filed Oct. 6, 1965, now abandoned.

RELATED CASE

This invention relates to pharmaceutical compositions containing as an active ingredient an α-methyl-phenylalanine compound. More particularly, it relates to a stable oral, liquid pharmaceutical formulation containing an α-methyl-phenylalanine.

The therapeutically active compounds known as α-methylphenylalanines and the production thereof are disclosed in the Pfister Pat. No. 2,868,818, the disclosure of which is incorporated herein by reference and made a part hereof. These compounds have well-known therapeutic utility.

Included in these compounds are those having the formulas:

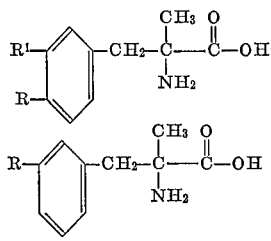

wherein R is selected from the group consisting of hydroxy, alkoxy and acyloxy radicals having a carbon chain length from 1 to 4 carbon atoms, and $R^1$ is selected from the group consisting of hydrogen, hydroxy, alkoxy and acyloxy radicals having a carbon chain length of from 1 to 4 carbon atoms; and salts thereof.

Experience has shown that pharmaceutical compositions containing certain α-methyl-phenylalanines are slowly oxidized by air yielding colored compounds, thereby visibly discoloring the pharmaceutical preparation. It has also been observed that a loss of potency accompanies the oxidation and discoloration.

Accordingly, it is an object of this invention to prevent the oxidation of therapeutically active α-methyl-phenylalanine compounds. It is another object of this invention to prevent such oxidation and at the same time prepare a stable, oral, liquid pharmaceutical formulation of an α-methyl-phenyl-alanine.

It is also an object of this invention to provide such a pharmaceutical preparation in which the loss of potency accompanying oxidation of the α-methyl-phenylalanine compound is reduced. Repeated opening of the containing bottle to withdraw a fractional amount for a single dose, and the repeated entrance of atmospheric oxygen does not result in a visible color change nor loss in potency.

Additional objects and advantages of the composition of the present invention will appear from the following description and examples.

It has now been discovered that by adding to a pharmaceutical formulation containing an α-methyl-phenylalanine compound, sorbitol as a stabilizing agent, a water-soluble antioxidant, such as sodium bisulfite, and preferably such a water-soluble antioxidant and a chelating agent, such as ethylenediamine tetraacetate disodium, and by adjusting the pH to an acidic level, such a stable, oral, liquid pharmaceutical formulation may be prepared.

In the following test preparations, 5% by weight suspensions of levo-3-(3,4-dihydroxyphenyl)-2-methylalanine in either distilled water or sorbitol solution were prepared. By sorbitol solution is meant the U.S.P. aqueous preparation containing in each 100 gm. from 69 to 71 gm. of D-sorbitol of high purity. An equivalent amount of solid sorbitol may be substituted. One hundred ml. portions of these suspensions, with the additional additives shown, were placed in clear glass bottles and exposed to the temperature conditions noted and the resulting color changes, if any, were visually observed. Initially all of the preparations were milky white in appearance.

| Test preparation | Ingredient | Zero days Color | pH | 21 days 37° C. | Room temp. | 103 days 37° C. | Room temp. |
|---|---|---|---|---|---|---|---|
| 1 | Distilled water (I) | White | 4.9 | Grey | White | Black | Black. |
| 2 | Sorbitol solution (II) | do | 5.1 | do | Grey | do | Do. |
| 3 | I+0.05% EDTANa₂ (III) | do | 6.0 | Black | Black | do | Do. |
| 4 | II+0.05% EDTANa₂ | do | 6.1 | Grey | Grey | do | Do. |
| 5 | I+0.3% NaHSO₃ (IV) | do | 4.8 | White | White | Yellow white | Yellow white. |
| 6 | II+0.3% NaHSO₃ | do | 5.1 | do | do | White | Do. |
| 7 | I+III+IV | do | 5.2 | do | do | Slightly yellow white | Slightly yellow white. |
| 8 | II+III+IV | do | 5.3 | do | do | White | White. |

From Test Preparations 1 through 8, it can be observed that the incorporation in a pharmaceutical composition containing an α-methyl-phenylalanine in sorbitol solution of an antioxidant such as sodium bisulfite, and preferably additionally a chelating agent such as ethylenediamine tetraacetate disodium, highly stable preparations may be prepared.

Preparation 2 shows by the color change that sorbitol alone is not able to protect the phenylalanine compound against deterioration. Preparation 5 shows that the antioxidant alone does not provide adequate protection. Preparation 6 shows that a combination of the agents, sorbitol solution and sodium bisulfite protects the phenylalanine compound against decomposition. It has also been observed by active ingredient assays that the composition of Test Preparation 8 after 103 days of storage is found to contain 5% more active ingredient than that of Test Preparation 7.

In practicing the invention the preparation should contain the following:

Table

α-Methylphenylalanine compound—2–10% w./v.
Sorbitol solution—55–100% v./v.
Sodium bisulfite—0.03–3.0% w./v.
Ethylenediamine tetraacetate disodium—0–0.1% w./v.
Distilled water—0–40% v./v.
HCl or NaOH sufficient to—pH 2 to 7.

To this preparation may or may not be added desired coloring, flavoring, suspending, wetting and preservative agents. Equivalent agents, as mentioned below, may be substituted in this table and the following example. Representative embodiments of the composition of this invention are set forth as follows, parts being expressed as weight per volume or volume per volume, as noted.

EXAMPLE I

Ingredient:
    Levo-3-(3,4-dihydroxyphenyl)-2-
      methylalanine—5% w./v.
    Sodium bisulfite—0.3% w./v.
    Sorbitol solution—q.s.

Due to the sodium bisulfite the pH of this preparation is about 5.1. The preparation can be made more acid by adding N/10 HCl or more basic by adding N/10 NaOH. A commercial product which would contain a suspending agent to avoid undesirable settling and include a preservative is the following:

EXAMPLE II

Ingredient:
    Levo-3-(3,4-dihydroxyphenyl)-2-
      methylalanine—5% w./v.
    Sodium bisulfite—0.3% w./v.
    Gum tragacanth—0.4% w./v.
    Sorbic acid—0.1% w./v.
    Distilled water—22.0% v./v.
    Sorbitol solution—q.s.

The above formulations show satifactory physical and chemical stability after six months storage at 50° C., 37° C., and at room temperature.

Equivalent amino carboxylic chelating agents such as ethylenediaminetetraacetic acid and its salts, N-hydroxyethylenediaminetriacetic acid trisodium salt, diethylenetriaminopentacetic acid pentasodium salt, nitrolotriacetic acid, and diethanolglycine sodium salt may be utilized.

Where the particle size of the α-methylphenylalanine is sufficiently low or when the α-methylphenylalanine is flocculated, the suspending agent may be omitted.

Equivalent well-known suspending agents which will function in accordance with the composition of this invention are other hydrocolloidal gums, such as gum acacia and guar gum; polysaccharides, such as agar, algin and chondrus; modified cellulose, such as methyl cellulose, carboxymethyl cellulose and hydroxy methyl cellulose; proteins and clays.

Equivalent preservatives such as benzoic acid may be utilized, and equivalent compatible surfactants, dyes and flavors may be utilized without departing from the spirit and scope of the composition of this invention as described and claimed herein.

Equivalent antioxidants are other inorganic sulfur compounds, such as sodium metabisulfate and sodium thiosulfate and sodium sulfite; organic sulfur compounds, such as thioglycerol, thioglycolic acid, cysteine, and thiourea acids, such as ascorbic acid and isoascorbic acid.

The invention contemplates that, if desired, any pharmaceutically acceptable wetting agent, coloring agent, or flavoring agent may be added.

What is claimed is:

1. A stable, oral, liquid pharmaceutical formulation having the following approximate composition:

Ingredient:
    Levo-3-(3,4-dihydroxyphenyl)-2-
      methylalanine—5% w./v.
    Sodium bisulfite—0.3% w./v.
    Sorbitol solution—q.s.

References Cited

UNITED STATES PATENTS

| | | | |
|---|---|---|---|
| 2,055,064 | 9/1936 | Bockmühl | 424—310 |
| 2,647,928 | 8/1953 | Stemple | 424—329 |
| 2,868,818 | 1/1959 | Pfister | 424—330 |
| 2,887,435 | 5/1959 | Witty | 424—330 |
| 3,149,035 | 9/1964 | Riegelman | 424—148 |
| 3,228,834 | 1/1966 | Gans | 424—244 |
| 3,230,146 | 1/1966 | Marcus | 424—330 |

OTHER REFERENCES

Chem. Abst., 56, p. 9174b (1962).
Chem. Abst., 57, p. 7443H (1962).

ALBERT T. MEYERS, Primary Examiner
S. J. FRIEDMAN, Assistant Examiner

U.S. Cl. X.R.
424—319